June 24, 1941.                R. HOE                    2,246,589
                          SLICING MECHANISM
                         Filed June 20, 1939          2 Sheets-Sheet 1
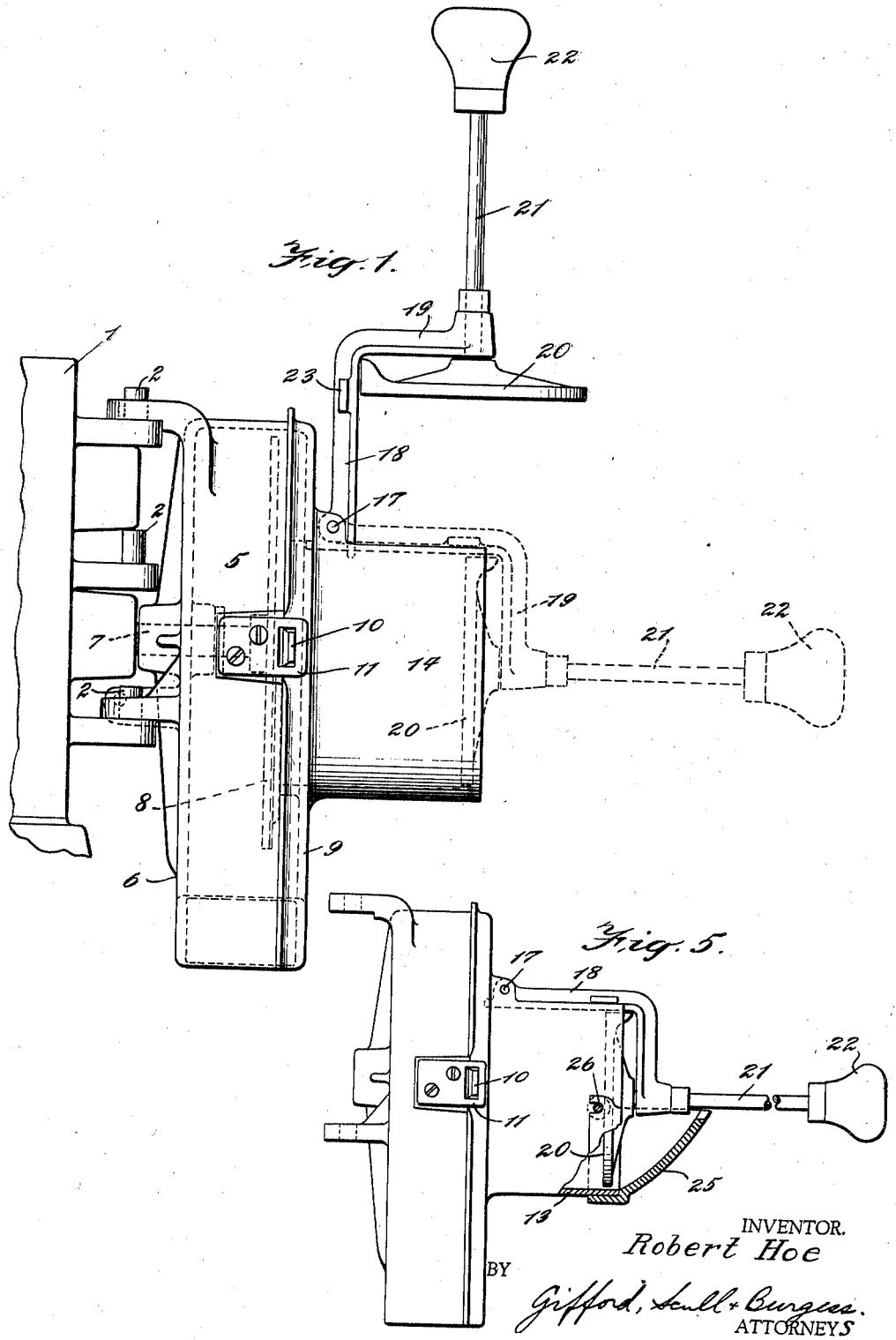
INVENTOR.
Robert Hoe
BY
Gifford, Scull & Burgess.
ATTORNEYS

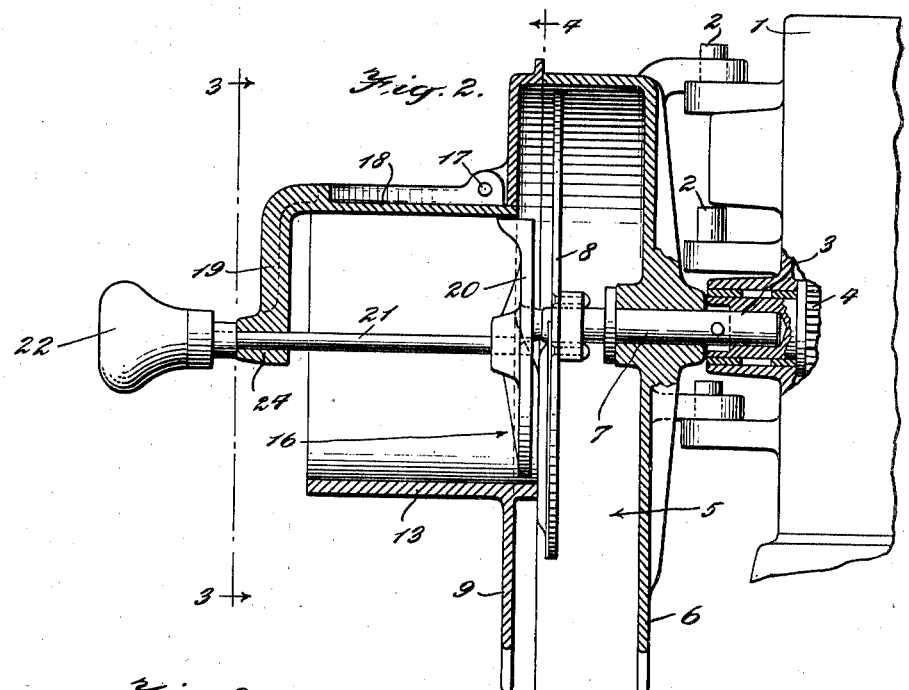

Patented June 24, 1941

2,246,589

UNITED STATES PATENT OFFICE 2,246,589

SLICING MECHANISM

Robert Hoe, Hyde Park, N. Y.

Application June 20, 1939, Serial No. 280,023

4 Claims. (Cl. 146—115)

This invention relates to a novel and improved form of slicing mechanism and more particularly to an improvement upon what is shown in my prior Patent 1,983,666. The novel features will be best understood from the following description and the annexed drawings, in which I have shown selected embodiments of the invention and in which:

Fig. 1 is an elevation of one embodiment of the invention as applied to a power unit;

Fig. 2 is a vertical sectional view taken approximately on the line 2—2 of Fig. 3;

Fig. 3 is a view taken approximately on the line 3—3 of Fig. 2;

Fig. 4 is a view taken approximately on the line 4—4 of Fig. 2;

Fig. 5 is a view on a smaller scale but similar to Fig. 1 and showing a slightly different form of the invention.

The invention is shown as used with a power unit, such as that indicated in my said prior patent and which is indicated generally at 1. Such a unit comprises a casing having hinge pins 2 on the front wall thereof in position so as to support a device of any kind which may be operated by a driving shaft from one or more power outlets. In the present instance the device shown is operated from a power outlet comprising a shaft 3 which may be rotated by suitable gearing, part of which is indicated at 4.

The device is shown as a slicing mechanism comprising a casing 5 having a rear wall 6 in which is journaled a driven shaft 7, upon the outer or front end of which is a cutter 8. This cutter may be of any of the several forms indicated in said prior patent or may take any other desired form.

The front wall 9 of the casing 5 is shown as being detachable from the rear part thereof and the two parts may be secured together by any suitable means, here exemplified as a lug 10 on the front wall which may be inserted in a hole in an ear 11 on the rear wall cooperating with a threaded pin 12 passing through aligned ears on the two parts. This fastening means is merely exemplary of any suitable means and further details are not necessary to an understanding of the invention.

Extending forwardly from the front wall 9 is an apron 13 having vertically extending sides 14 and 15, the top edges of which are preferably in the same horizontal plane. The apron extends around the bottom and the vertical sides of a hole 16 in the front wall 9 and this hole is designed to receive articles of food, such as vegetables or fruit, which are to be sliced or grated or otherwise treated by the cutter 8, after which the food will fall through the open bottom of the casing 5 into a pan or other receptacle. The cutter may be of any desired form, but I have shown in the drawings the cutter and its supporting disk fully described in my Patent No. 1,983,666, granted December 11, 1934.

Hinged to the front wall of the casing, preferably on a horizontal pivot 17, is a bracket 18 having an arm 19 in which is slidably mounted a pusher which may comprise a head 20 and a rod 21 to which is attached a handle 22. The head is preferably shaped so as to conform closely to the apron, as plainly shown in Figs. 3 and 4, and when the bracket is in its lowest position, as indicated in dotted lines in Fig. 1 and in full lines in Fig. 2, it will be seen that the arm 19 extends across the end of the apron, where it is in a position for the head of the pusher to occupy the position indicated in Figs. 3 and 4. Then the pusher may be operated. It will be understood that when the bracket is raised to the position shown in Fig. 1 in full lines, articles of food may be placed in the apron and then the bracket may be lowered to its lowest position, whereupon the pusher may be moved rearwardly to force the food towards the cutter. At the same time, the bracket will be held against further downward movement by stops on the bracket, here indicated at 23, which will engage the upper edges of the sides 14 and 15. When the bracket is held in this position by the stops, the head 20 is substantially out of contact with the apron at all points so that it may be slid back and forth easily. The rod 21 has a sufficiently long bearing 24 in the arm 19 so as to insure rectilinear movement of the rod.

Preferably also, the bracket 18 is wide enough so as to substantially close the top of the apron, thus forming a substantially closed receptacle for food.

In Fig. 5 is shown a modification in which the apron is provided with a forward extension 25 which is concentric with the pivot 17 so that food, for example nuts which are to be ground, may be placed in the apron and then the bracket may be moved downward and at the same time the pusher may be moved backward towards the cutter. The extension 25 may be and preferably is made detachable, for example being held to the apron 13 by pins, one of which is indicated at 26. The details of these attaching means are not necessary to an understanding of the invention and therefore will be omitted.

I claim:

1. In combination, a food cutter, a casing enclosing said cutter and having a front wall with a hole therein, an apron beneath said hole and extending forwardly therefrom and having vertically extending sides, a bracket hinged to said wall on a horizontal pivot adjacent the upper edges of said sides, said bracket when in its lowest position substantially closing the space between said upper edges, an arm on said bracket extending across the outer end of the apron when the bracket is in said lowest position, a pusher slidably mounted on said arm and arranged to push food along said apron, and means to operate said cutter.

2. In combination, a food cutter, a casing enclosing said cutter and having a front wall with a hole therein, an apron beneath said hole and extending forwardly therefrom and having vertically extending sides, a bracket hinged to said wall on a horizontal pivot adjacent the upper edges of said sides, said bracket when in its lowest position having an arm extending across the outer end of the apron, a pusher slidably mounted on said arm and arranged to push food along said apron, and means to operate said cutter.

3. In combination, a food cutter, a casing enclosing said cutter and having a front wall with a hole therein, an apron beneath said hole and extending forwardly therefrom and having vertically extending sides, a bracket hinged to said wall on a horizontal pivot adjacent the upper edges of said sides, said bracket when in its lowest position having an arm extending across the outer end of the apron, a pusher slidably mounted on said arm and arranged to push food along said apron, means to operate said cutter, and members on the bracket and apron holding the bracket in said lowest position without substantial contact between the pusher and the apron.

4. In combination, a food cutter, a casing enclosing said cutter and having a front wall with a hole therein, an apron beneath said hole and extending forwardly therefrom and having vertically extending sides, a bracket hinged to said wall on a horizontal pivot adjacent the upper edges of said sides, said bracket when in its lowest position having an arm extending across the outer end of the apron, a pusher slidably mounted on said arm and arranged to push food along said apron, means to operate said cutter, and a forward extension on said apron concentric with said pivot.

ROBERT HOE.